United States Patent
Salter et al.

(10) Patent No.: US 12,202,406 B2
(45) Date of Patent: Jan. 21, 2025

(54) SYSTEMS AND METHODS TO GUIDE AN INDIVIDUAL TO AN ELECTRICAL POWER OUTLET IN A VEHICLE

(71) Applicant: Ford Global Technologies, LLC, Dearborn, MI (US)

(72) Inventors: Stuart C. Salter, White Lake, MI (US); Brendan Diamond, Grosse Pointe, MI (US); Ryan O'Gorman, Beverly Hills, MI (US); David Celinske, Wolverine Lake, MI (US); Paul Kenneth Dellock, Northville, MI (US); David Brian Glickman, Southfield, MI (US); Vyas Shenoy, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 297 days.

(21) Appl. No.: 17/936,030

(22) Filed: Sep. 28, 2022

(65) Prior Publication Data

US 2024/0101029 A1    Mar. 28, 2024

(51) Int. Cl.
*G08B 21/00* (2006.01)
*B60Q 9/00* (2006.01)
(Continued)

(52) U.S. Cl.
CPC .............. *B60Q 9/00* (2013.01); *B60R 25/305* (2013.01); *G06V 20/56* (2022.01); *G06V 40/10* (2022.01);
(Continued)

(58) Field of Classification Search
CPC ........ B60Q 9/00; B60R 25/305; G06V 20/56; G06V 40/10; G08B 7/06; H01R 13/44; H01R 2201/26
(Continued)

(56) References Cited

U.S. PATENT DOCUMENTS 7,812,476 B2 * 10/2010 Menas ................ H02J 7/00047
307/11
8,461,725 B1 *  6/2013 Stubbs ..................... H01H 9/54
307/140
(Continued)

FOREIGN PATENT DOCUMENTS

ES         2807957 T3 *  2/2021  ............... B60D 1/64

OTHER PUBLICATIONS

Aaron Bragman, 5 Fun Facts About the 2021 F-150's Onboard Generator, Ford Global Technologies, LLC, Jun. 25, 2020, 1-5.
(Continued)

*Primary Examiner* — Mark S Rushing
(74) *Attorney, Agent, or Firm* — Frank Lollo; Eversheds Sutherland (US) LLP (57) ABSTRACT

The disclosure is generally directed to systems and methods for guiding an individual to an electrical power outlet in a vehicle. An example method executed by a processor of an electrical power outlet controller in a vehicle includes determining that an individual is seeking an electrical power outlet provided on the vehicle, selecting a first electrical power outlet from a plurality of electrical power outlets provided on the vehicle, and providing location information of the first electrical power outlet. The location information may be provided in various forms such as in the form of an audio signal (a beeping sound produced by a beeper, for example), a visual indication (a light source illuminating the electrical power outlet, for example) an audible instruction (navigation assistance provided via a speaker, for example), a graphical indication (navigation assistance via a personal device), and/or a text message (navigation assistance via a personal device).

18 Claims, 6 Drawing Sheets

(51) Int. Cl.
*B60R 25/30* (2013.01)
*G06V 20/56* (2022.01)
*G06V 40/10* (2022.01)
*G08B 7/06* (2006.01)
*H01R 13/44* (2006.01)

(52) U.S. Cl.
CPC ............... *G08B 7/06* (2013.01); *H01R 13/44* (2013.01); *H01R 2201/26* (2013.01)

(58) Field of Classification Search
USPC .......................................................... 340/438
See application file for complete search history.

(56) References Cited

U.S. PATENT DOCUMENTS

| | | |
|---|---|---|
| 10,328,940 B2 | 6/2019 | Cikalo et al. |
| 2013/0049685 A1* | 2/2013 | Farah ..................... B60L 53/16 320/109 |
| 2015/0108830 A1* | 4/2015 | Gaynier ................ B60R 16/03 307/9.1 |
| 2018/0072252 A1 | 3/2018 | Collins et al. |
| 2021/0053460 A1* | 2/2021 | Oh .......................... B60L 55/00 |

OTHER PUBLICATIONS

Jessica Shea Choksey, What is Ford Pro Power OnBoard?, Ford Global Technologies, LLC, Feb. 16, 2021, 1-12.
Joe Wiesenfelder, We Charged a Ford Mustang Mach-E With an F-150, Ford Global Technologies, LLC, Jan. 13, 2022, 1-15.

* cited by examiner

SYSTEMS AND METHODS TO GUIDE AN INDIVIDUAL TO AN ELECTRICAL POWER OUTLET IN A VEHICLE

BACKGROUND

Some vehicles are equipped with electrical power outlets that can be used for powering various devices such as lights, personal devices, and power tools. It is desirable to address certain issues associated with the use of these electrical power outlets such as, for example, issues pertaining to ease of access and convenience.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, embodiments described in this disclosure are generally directed to systems and methods for guiding an individual to an electrical power outlet in a vehicle. An example method executed by a processor of an electrical power outlet controller in a vehicle includes determining that an individual is seeking an electrical power outlet provided on the vehicle, selecting a first electrical power outlet from a plurality of electrical power outlets provided on the vehicle, and providing location information of the first electrical power outlet. The location information may be provided in various forms such as in the form of an audio signal (a beeping sound produced by a beeper located next to the first electrical power outlet, for example), a visual indication (a light source illuminating the electrical power outlet, for example) an audible instruction (navigation assistance provided via a speaker, for example), a graphical indication (navigation assistance via a personal device), and/or a text message (navigation assistance via a personal device).

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "information" as used herein pertains to any of various forms of data that can be processed by a processor (digital data, digital images, detector signals, etc.). The word "image" as used herein encompasses one or more images in one or more forms. Thus, for example, a description herein of an action associated with an "image" must be understood to indicate an action performed upon a single image in some scenarios and upon multiple images in some other scenarios. The multiple images can be included in various forms such as, for example, in the form of a video clip, and/or in the form of real-time video.

The word "detector" as used herein refers to any device than may be used to obtain information about an object, to detect the presence of an object, and/or to detect actions performed by individuals. The word "object" and the word "item" are used in this disclosure in an interchangeable manner. The word "vehicle" as used in this disclosure can pertain to any one of various types of vehicles such as cars, vans, sports utility vehicles, trucks, electric vehicles, gasoline vehicles, and hybrid vehicles.

It must be understood that words such as "implementation," "application," "scenario," "case," and "situation" as used herein are an abbreviated version of the phrase "In an example ("implementation," "application," "scenario," "case," "approach," and "situation") in accordance with the disclosure." It must also be understood that the word "example" as used herein is intended to be non-exclusionary and non-limiting in nature.

Figure 1:
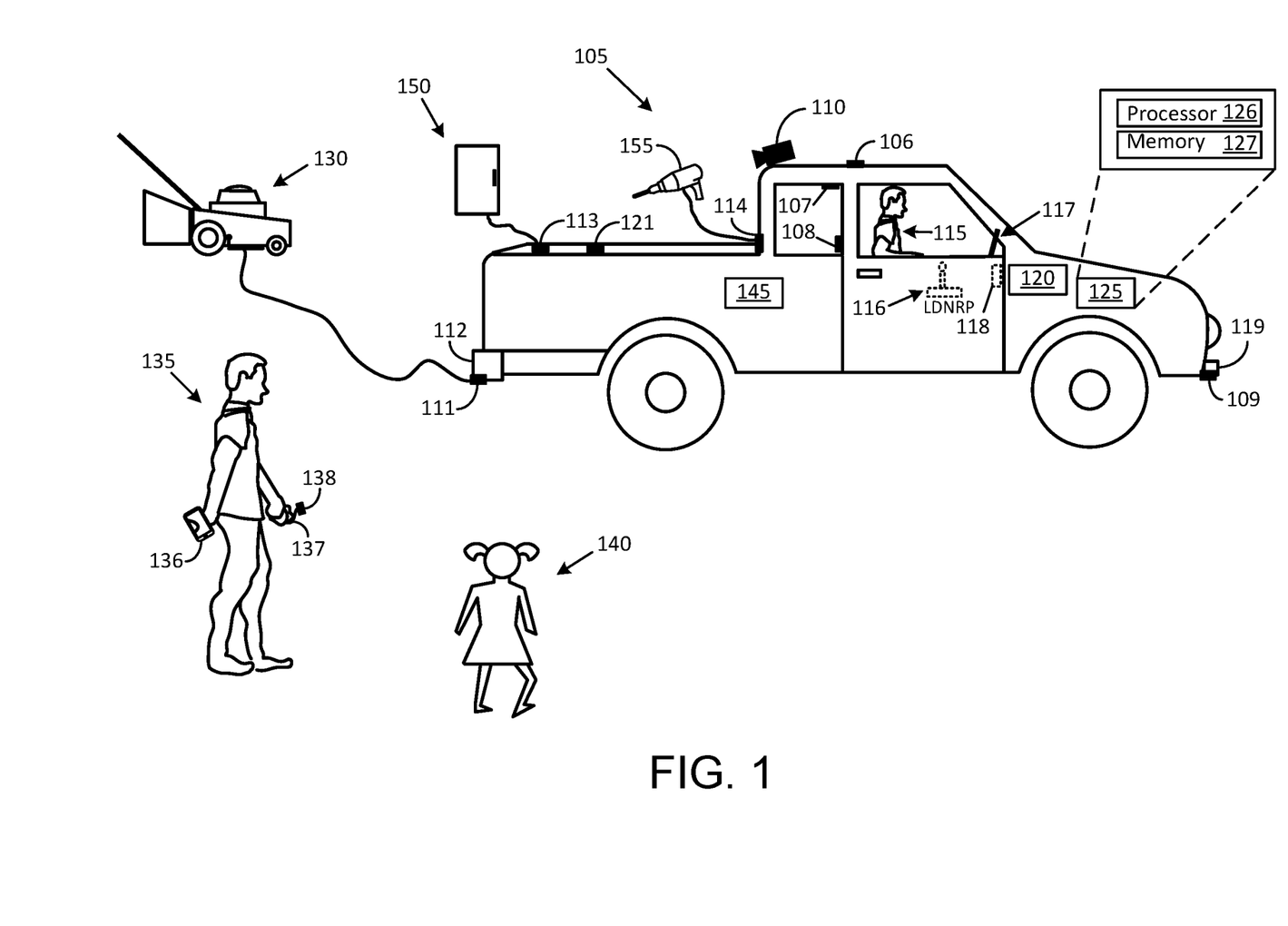
FIG. 1 shows an example vehicle that includes an electrical power outlet controller in accordance with an embodiment of the disclosure.

FIG. 1 shows a vehicle 105 that includes an electrical power outlet controller system 125 in accordance with an embodiment of the disclosure. The vehicle 105 may further include components such as, for example, a vehicle computer 120, a camera 110, an infotainment system 117, and an electrical power source 145. These components may be communicatively coupled to the electrical power outlet controller system 125 via a wired communication system and/or a wireless communication system. The vehicle 105 may further include one or more electrical power outlets that are configured to offer access to electrical power provided by the electrical power source 145. The electrical power source 145 may be controlled by the electrical power outlet controller system 125 in accordance with the disclosure.

In the illustrated example, the vehicle 105 is a truck containing a cargo bed on which items can be placed and the description herein pertains to various systems and methods of operation associated with the truck. However, it must be understood that the systems and methods of operation described herein are equally applicable to various other types of vehicles (sedan, van, sports utility vehicle, forklift, etc.). Thus, for example, a description pertaining to characteristics and operations of an electrical power outlet of the truck that is illustrated in FIG. 1 is equally applicable to an electrical power outlet of a van or a sedan, for example.

The vehicle computer 120 may perform various functions of the vehicle 105, such as, for example, controlling engine operations (fuel injection, speed control, emissions control, braking, etc.), managing climate controls (air conditioning, heating etc.), activating airbags, and issuing notifications (check engine light, bulb failure, low tire pressure, etc.). The vehicle computer 120 may also provide various types of information to the electrical power outlet controller system 125, such as, for example, information pertaining to operations associated with the vehicle 105 (speed, movement status, parked status, etc.).

In the illustrated implementation, the camera 110 is an example device that can be used to provide information to the electrical power outlet controller system 125 in the form of images. In other implementations, additional cameras and/or other types of devices may be used to provide information to the electrical power outlet controller system 125. The images provided by the camera 110 may be evaluated by the electrical power outlet controller system 125 for various purposes. In an example scenario, the electrical power outlet controller system 125 may evaluate one or more images provided by the camera 110 to detect an individual 135 who may be moving towards the vehicle and/or to detect a child 140 who is in the vicinity of the vehicle 105. The electrical power outlet controller system 125 may then execute various actions upon one or more electrical power outlets provided in the vehicle 105.

The example electrical power outlets provided in the vehicle 105 include a first set of electrical power outlets that may include an electrical power outlet 107, an electrical power outlet 108, and an electrical power outlet 118 that are located in a cabin area of the vehicle 105. The vehicle 105 further includes a second set of electrical power outlets that may include an electrical power outlet 109, an electrical power outlet 106, an electrical power outlet 114, an electrical power outlet 113, an electrical power outlet 121, and an electrical power outlet 111 that are located outside the cabin area. The electrical power outlets may have various form factors and characteristics (two-hole socket, three-hole socket, US-type layout, European-style layout, etc.) and may be mounted upon various parts of the vehicle 105 such as, for example, a bumper, a grille, a tailgate, a roof, a chassis, or a body panel.

In the illustrated example, the electrical power outlet 109 is located underneath a front bumper 119 of the vehicle 105, the electrical power outlet 106 is located on the roof of the vehicle 105, the electrical power outlet 114 is located on a body panel behind a cabin wall of the vehicle 105, the electrical power outlet 113 and the electrical power outlet 121 are located on a side panel of the cargo bed of the vehicle 105, and the electrical power outlet 111 is located behind or underneath a rear bumper 112 of the vehicle 105.

The electrical power source 145 can include any of various types of components that produce one or more of various types of voltages such as, for example, 5V DC, 12V DC, 110V AC, and 220V AC. In an example implementation, the electrical power source 145 can produce 5V DC that may be provided via the electrical power outlet 118 for use by an occupant of the vehicle 105 (a driver 115, for example). The electrical power outlet 118 may be provided in the form of a USB socket located on an instrument console of the vehicle 105. In another example implementation, the electrical power source 145 can produce 12V DC that may be provided for use by the occupant of the vehicle 105 via the electrical power outlet 118, which may be provided in the form of a cigarette lighter socket, for example. Similar voltages, or other voltages, may be provided via other electrical power outlets in the cabin of the vehicle 105 and outside the cabin of the vehicle 105.

In at least some cases, the electrical power outlets provided outside the cabin of the vehicle 105 may be configured for some types of use that may be similar to those that are applicable to the electrical power outlets in the cabin of the vehicle 105. For example, the electrical power outlet 121 may be configured for charging a personal device such as, for example, a personal device 136 carried by the individual 135. The personal device 136 can be any of various devices such as, for example, a smartphone, a smartwatch, or a portable music system. The individual 135 may also carry a charging cable 137 having a connector 138 (a USB plug, for example) that is compatible with the electrical power outlet 121 (a USB socket, for example).

In some other cases, the electrical power outlets provided outside the cabin of the vehicle 105 may be configured for some types of use that may be different from those applicable to the electrical power outlets inside the cabin of the vehicle 105. For example, in one implementation, the electrical power outlet 111 located behind or underneath the rear bumper 112 of the vehicle 105, may be a 3-hole electrical socket that supplies 110V AC voltage for operating a component such as a lawn mower 130 and the electrical power outlet 118 located in the cabin area of the vehicle 105 can be a USB connector that allows charging of a personal device 136 (a smartphone, for example). The 110V AC power may also be additionally supplied via other electrical power outlets for operating various other types of items such as, for example, a portable refrigerator 150 that is shown plugged into the electrical power outlet 113 and a hand drill 155 that is shown plugged into the electrical power outlet 114.

Some of the items that are plugged into the electrical power outlets of the vehicle 105 are portable and may be transported in the vehicle 105 while plugged into an electrical power outlet of the vehicle 105. One example of such an item is the hand drill 155 that is plugged into the electrical power outlet 114. However, it may be undesirable to transport some other items while plugged into an electrical power outlet of the vehicle 105. One example of such an item is the lawn mower 130 that is plugged into the electrical power outlet 111.

Accordingly, the electrical power outlet controller system 125 may be configured to detect and address an example scenario where the driver 115 may be unaware (or may have overlooked) the lawn mower 130 (for example) that is plugged into the electrical power outlet 111 and begins to drive the vehicle 105. The electrical power outlet controller system 125 detects the action taken by the driver 115 and disconnects electrical power supplied to the electrical power outlet 111.

More particularly, a processor 126 of the electrical power outlet controller system 125 is configured to access a memory 127 and execute computer-executable instructions stored in the memory 127 to perform various operations in accordance with the disclosure such as, for example, disconnecting electrical power supplied to the electrical power outlet 111 upon detecting an action taken by the driver 115 and/or upon detecting an operation of a component of the vehicle 105.

In an example implementation, the processor 126 detects a transition of the vehicle 105 from a park mode to a drive mode by monitoring a condition of a drive selector 116 in the vehicle 105. In an example scenario, the processor 126 detects the drive selector 116 being changed from a park position ("P") to a position where the vehicle 105 can be moved such as a low gear drive position ("L"), a forward drive position ("D"), a neutral position ("N"), or a reverse drive position ("R").

In another example implementation, the processor 126 detects a transitioning of the vehicle 105 from a parked condition to a moving condition based on evaluating a signal received from the vehicle computer 120 and/or components such as a movement detector (not shown) or a speedometer (not shown).

In another example implementation, the processor 126 detects a transitioning of the vehicle 105 from a parked condition to a moving condition based on evaluating one or more images provided by the camera 110. The one or more images may be provided in the form of a video-clip produced by the camera 110 in real time.

In another example implementation, the processor 126 may disconnect electrical power supplied to the electrical power outlet 111 (and/or to other electrical power outlets in the vehicle 105) based on detecting a moving condition of the vehicle 105. The disconnecting operation may be carried out by conveying a control signal to a component such as, for example, a relay, a circuit breaker, or a switch that is provided on a power line. In some scenarios, the processor 126 may further ensure that no other unpowered electrical power outlets located outside the cabin of the vehicle 105 are provided electrical power when the vehicle 105 is moving.

However, in an example implementation, the processor 126 may enable powering up of one or more electrical power outlets, or retaining, one or more electrical power outlets in a powered-up state when the vehicle is moving. This action may be carried out for various reasons. For example, the processor 126 may enable powering up an electrical power outlet (or retaining the electrical power outlet in a powered-up state) in response to an authorization command received from an individual such as, for example, the driver 115. The authorization command may be conveyed to the electrical power outlet controller system 125 in various ways such as, for example, via a graphical user interface (GUI) of the infotainment system 117 or via a personal device (not shown) carried by the driver 115.

In another example implementation, the processor 126 may determine that it is permissible for a device (such as, for example, the hand drill 155 that is connected to the electrical power outlet 114) to be provided electrical power when the vehicle 105 is in motion. In this case, the processor 126 may communicate with the vehicle computer 120 to limit a speed of movement of the vehicle 105 to a threshold speed. The threshold speed may be determined on the basis of various factors such as, for example, a comfort factor, and/or a personal preference.

In another example implementation, the processor 126 may, for various reasons, evaluate images provided by the camera 110 to the electrical power outlet controller system 125 when the vehicle 105 is in a parked condition. In an example scenario, the processor 126 may evaluate the images and detect the individual 135 moving towards the vehicle 105 and may also, in some cases, determine an identity of the individual 135. The processor 126 may then authorize the use of some (or all) electrical power outlets by the individual 135, based on factors such as, for example, the individual 135 being an authorized user of the electrical power outlets of the vehicle 105, an age of the individual 135, and/or an identity of the individual 135.

In another example scenario, the processor 126 may evaluate the images provided by the camera 110 and detect a child 140 near the vehicle 105. In this scenario, the processor 126 may disable some (or all) electrical power outlets of the vehicle 105.

Figure 2:
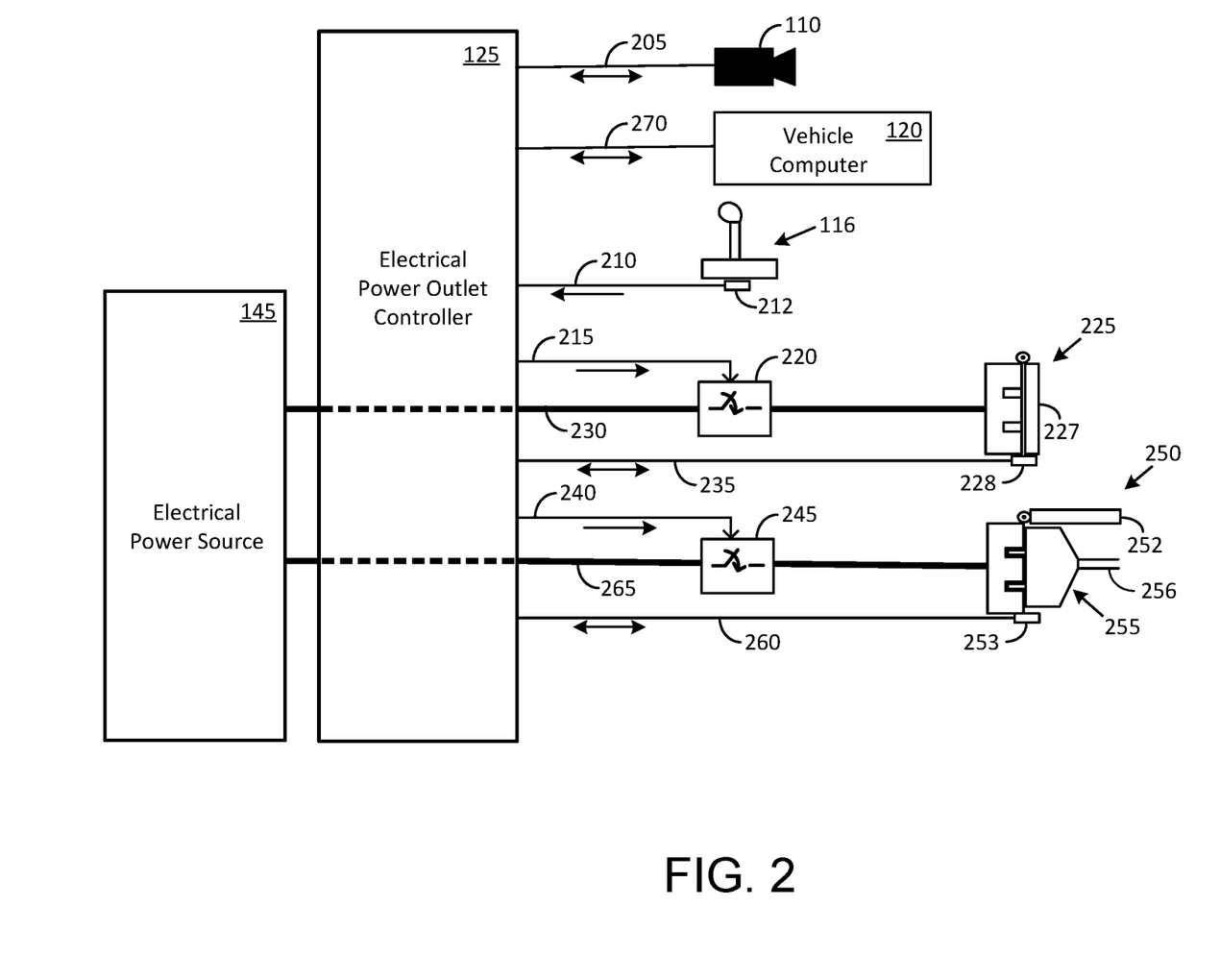
FIG. 2 illustrates an example configuration that may be associated with an electrical power outlet controller system in accordance with an embodiment of the disclosure.

FIG. 2 illustrates an example configuration that may be associated with the electrical power outlet controller system 125 in accordance with an embodiment of the disclosure. In this example configuration, the electrical power outlet controller system 125 is shown controlling power provided to two example electrical power outlets—an electrical power outlet 225 and an electrical power outlet 250. However, it must be understood that the description provided herein is equally applicable to configurations where the electrical power outlet controller system 125 controls power provided to a single electrical power outlet or to more than two electrical power outlets. The electrical power outlets can be of various types such as, for example, the various electrical power outlets described above with reference to FIG. 1.

Electrical power is provided to the two example electrical power outlets by the electrical power source 145. As indicated above, the electrical power source 145 can include any of various types of components that can produce various types of voltages such as, for example, an AC power supply, a DC power supply, a DC-to-AC converter, and/or a battery. The various components may provide one or more voltages such as, for example, 5V DC, 12V DC, 110V AC, and 220V AC.

In the illustrated configuration, various other objects are coupled to the electrical power outlet controller system 125. The objects can include, for example, the camera 110, the vehicle computer 120, a sensor 212 coupled to the drive selector 116, a switch 220, a detector 228, a switch 245, and a detector 253. The camera 110 is coupled to the electrical power outlet controller system 125 via a bidirectional link 205 that can be implemented by use of any of various wired and/or wireless media such as, for example, a coaxial cable, an optical fiber, and/or a WiFi link. The bidirectional link 205 may be used to convey commands (such as, for example, an image capture command) from the electrical power outlet controller system 125 to the camera 110 and for conveying images in the opposite direction from the camera 110 to the electrical power outlet controller system 125.

The vehicle computer 120 is coupled to the electrical power outlet controller system 125 via a bidirectional link 270 that can be implemented by use of any of various wired and/or wireless media such as, for example, a coaxial cable, an optical fiber, and/or a WiFi link. The bidirectional link 270 may be used to convey requests (such as, for example, a request for engine operating information or vehicle movement status) from the electrical power outlet controller system 125 to the vehicle computer 120 and for conveying requested information in the opposite direction from the vehicle computer 120 to the electrical power outlet controller system 125.

The sensor 212 that is coupled to the drive selector 116 is configured to detect a position of a lever of the drive selector 116 ("L", "D", "N", "R", or "P" positions). The sensor 212 is coupled to the electrical power outlet controller system 125 via a link 210 that can be implemented by use of any of various wired and/or wireless media such as, for example, a coaxial cable, an optical fiber, and/or a WiFi link. The link 210 may be used to convey position information of the lever of the drive selector 116 to the electrical power outlet controller system 125.

The switch 220 can be any of various devices such as, for example, a relay or a circuit breaker, and is configured to connect or disconnect electrical power carried on a power line 230 from the electrical power source 145 to the electrical power outlet 225. The electrical power outlet controller system 125 can disconnect power to the electrical power outlet 225 by sending a first switch control signal (via a link 215) to the switch 220 that places the switch 220 in an open position. The electrical power outlet controller system 125 can reconnect power to the electrical power outlet 225 by sending a second switch control signal to the switch 220 (via the link 215) that places the switch 220 in a closed position.

The detector 228 is coupled to the electrical power outlet 225 in a configuration that allows the detector 228 to produce a first detection signal when a cover 227 that is attached to the electrical power outlet 225 is in an open position. The electrical contacts of the electrical power outlet 225 are exposed when the cover 227 is in the open position. When exposed, the electrical contacts allow an electrical connector (not shown) to be mated with the electrical power outlet 225.

The detector 228 is coupled to the electrical power outlet controller system 125 via a link 235 that can be implemented by use of any of various wired and/or wireless media such as, for example, a coaxial cable, an optical fiber, and/or a WiFi link. The link 235 may be used to convey a status information of the cover 227 (closed or open) to the electrical power outlet controller system 125. The link 235 may also be used by the electrical power outlet controller system 125 to transmit a signal for retaining the cover 227 in a closed position (or in an open position). Retaining the cover 227 (and other such covers) in a closed position may be desirable particularly when the vehicle 105 is in motion. In some cases, the electrical power outlet controller system 125 may either close or open the cover 227 based on a time delay. The time delay may be set, for example, by the driver 115 or any other authorized individual (including the parent of a child 140 shown in FIG. 1).

In a first example operational scenario, the electrical power outlet controller system 125 obtains status information of the cover 227 from the detector 228. The cover 227 is in a closed condition in the illustrated example. At this time, the electrical power outlet controller system 125 may place the switch 220 in an open position so as to disconnect electrical power to the electrical power outlet 225.

In another example operational scenario, the electrical power outlet controller system 125 obtains status information of the cover 227 from a camera such as, for example, the camera 110 which may be configured to obtain an image of the electrical power outlet 225 and the cover 227. The electrical power outlet controller system 125 may evaluate the image and determine that the cover 227 is in a closed position. In this condition, the electrical power outlet controller system 125 may place the switch 220 in an open position so as to disconnect electrical power to the electrical power outlet 225.

In yet another example operational scenario, the electrical power outlet controller system 125 may include a current detecting device (not shown) that can identify a current flow in the power line 230. In the illustrated example, there is no current flow in the power line 230 because the electrical power outlet 225 is in an unused condition and the electrical power outlet controller system 125 may place the switch 220 in an open position.

The switch 245 may be similar to, or identical to the switch 220 described above, and is configured to disconnect electrical power provided from the electrical power source 145 and via the power line 265 to the electrical power outlet 250. The electrical power outlet controller system 125 can disconnect power to the electrical power outlet 250 by sending a first control signal to the switch 245 via a link 240 that places the switch 245 in an open position. The electrical power outlet controller system 125 can reconnect power to the electrical power outlet 250 by sending a second control signal via the link 240 to the switch 245 that places the switch 245 in a closed position.

The detector 253 is coupled to the electrical power outlet 250 in a configuration that allows the detector 253 to produce a first detection signal when a cover 252 that is attached to the electrical power outlet 250 is in an open position. The electrical contacts of the electrical power outlet 250 are exposed when the cover 252 is in the open position. When exposed, the electrical contacts allow an electrical connector 255 to be mated with the electrical power outlet 250.

The detector 253 is coupled to the electrical power outlet controller system 125 via a link 260 that can be implemented by use of any of various wired and/or wireless media such as, for example, a coaxial cable, an optical fiber, and/or a WiFi link. The link 260 may be used to convey a status information of the cover 252 (closed or open) to the electrical power outlet controller system 125.

In a first example operational scenario, the electrical power outlet controller system 125 obtains status information of the cover 252 from the detector 253, which in the illustrated example is in an open position. In this condition, the electrical power outlet controller system 125 may place the switch 220 in a closed position so as to provide electrical power to the electrical connector 255 that is mated with the electrical power outlet 250.

In another example operational scenario, the electrical power outlet controller system 125 obtains status information of the cover 252 from a camera such as, for example, the camera 110 which may be configured to obtain an image of the electrical power outlet 250 and the cover 252. The electrical power outlet controller system 125 may evaluate the image and determine that the cover 252 is in an open position and that no connector is mated to the electrical power outlet 250. At this time, the electrical power outlet controller system 125 may place the switch 220 in an open position so as to disconnect electrical power to the electrical power outlet 225. However, at another instant in time, the electrical power outlet controller system 125 may evaluate another image and determine that the electrical connector 255 is mated with the electrical power outlet 250. In this condition, the electrical power outlet controller system 125 places the switch 220 in a closed position so as to provide electrical power to the electrical connector 255.

In yet another example operational scenario, the electrical power outlet controller system 125 may include a current detecting device (not shown) that can identify a current flow in the power line 265. In the illustrated example, there may be current flow in the power line 230 because the electrical connector 255 is mated with the electrical power outlet 250 and a device may be drawing current via the electrical cord 256 that is coupled to the electrical connector 255.

In an example implementation, the electrical power outlet controller system 125 may place the switch 220 and/or the switch 245 in either an open or a closed position for a period of time irrespective of a movement state of the vehicle 105. An individual, such as, for example, the driver 115 of the vehicle 105 may provide authorization and/or a command to the electrical power outlet controller system 125 for placing the switch 220 and/or the switch 245 in either the open or the closed position. Thus, in an example scenario, an electrical power outlet can be forced to remain in a powered-up state even when the vehicle 105 is moving. The individual may provide the authorization and/or the command via the GUI of the infotainment system 117 or via the personal device 136, for example.

In another example implementation, the electrical power outlet controller system 125 may assign a first amount of electrical power to a first electrical outlet and a different amount of electrical power to a second electrical outlet over a period of time. The assignment may be based, for example, on a priority scheme that is directed at allowing a greater current draw from a first electrical power outlet than a second electrical power outlet (current draw by the lawn mower 130 versus current draw by the personal device 136, for example).

The assignment may alternatively be based on a load shedding scheme such as, for example, to allow a greater current draw from a first electrical power outlet than a second electrical power outlet. A higher priority device may be coupled to the first electrical power outlet. The load shedding scheme may also be applied for addressing a start-up surge that may be momentarily imposed upon the first electrical power outlet.

In some cases, the electrical power outlet controller system 125 may execute an assignment procedure based on an electrical current consumption plan that may involve predicting an amount of power that may be drawn from one or more electrical power outlets. A look-up table may be used for this purpose. The look-up table may include information pertaining to various parameters such as for example, electrical current draw history and temperature parameters (ambient temperature, engine temperature, etc.).

In another example implementation, the electrical power outlet controller system 125 may disconnect power to one or more electrical connectors (such as, for example, all electrical connectors located outside the cabin of the vehicle 105) when the vehicle 105 does not meet certain criterion such as, for example, when the vehicle 105 is moving at a speed that equals or exceeds a threshold.

Conversely, the electrical power outlet controller system 125 may connect power to one or more electrical connectors (such as, for example, all electrical connectors located outside the cabin of the vehicle 105) when the vehicle 105 satisfies the speed criterion (i.e., is moving at a speed that is less than the threshold speed).

In another example implementation, the electrical power outlet controller system 125 may turn on (or turn off) power provided to an electrical power outlet based on detecting a hand gesture or a spoken command of an individual.

In another example implementation, the electrical power outlet controller system 125 may detect a connector that is not fully plugged into an electrical power outlet (using a resistance measurement procedure or a current measurement procedure, for example) and alert the operator of the condition. The alert may be issued via the infotainment system 117 or the personal device 136, for example.

In another example implementation, the electrical power outlet controller system 125 may provide a recommendation for the use of one or more electrical power outlets. The recommendation, which may be provided via the infotainment system 117 or the personal device 136, for example, can be based on evaluating factors such as, for example, current draw from one or more electrical power outlets. The electrical power outlet controller system 125 may also provide a recommendation to the driver 115 to carry out certain actions such as, for example, to unplug a connector plugged from an electrical power outlet or to drive below a threshold speed.

In another example implementation, the electrical power outlet controller system 125 may place all exterior electrical power outlets in an unpowered state under certain circumstances such as, for example, when no authorized individual is present in or around the vehicle 105, if no authorized device is present in the vehicle 105, and/or if no authorized device is present inside a perimeter area defined around the vehicle 105. One example of an authorized device is the personal device 136 shown in FIG. 1. The personal device 136 may be configured to perform certain operations related to the vehicle 105, such as, for example, starting the vehicle 105 from outside the vehicle 105 and/or maneuvering the vehicle 105 from outside the vehicle 105 (automatic parking, for example).

In another example implementation, one or more individuals may be authorized to use an electrical power outlet and/or an in-cabin electrical power outlet by an authorizing authority such as, for example, the driver 115 of the vehicle 105. In some applications, the electrical power outlet controller system 125 may track usage of an electrical power outlet by an individual for purposes of levying a charging fee.

In another example implementation, the electrical power outlet controller system 125 may use a detector (a current flow detector, for example) to detect a dummy plug inserted into an electrical power outlet. The dummy plug may be used for various reasons.

Figure 3:
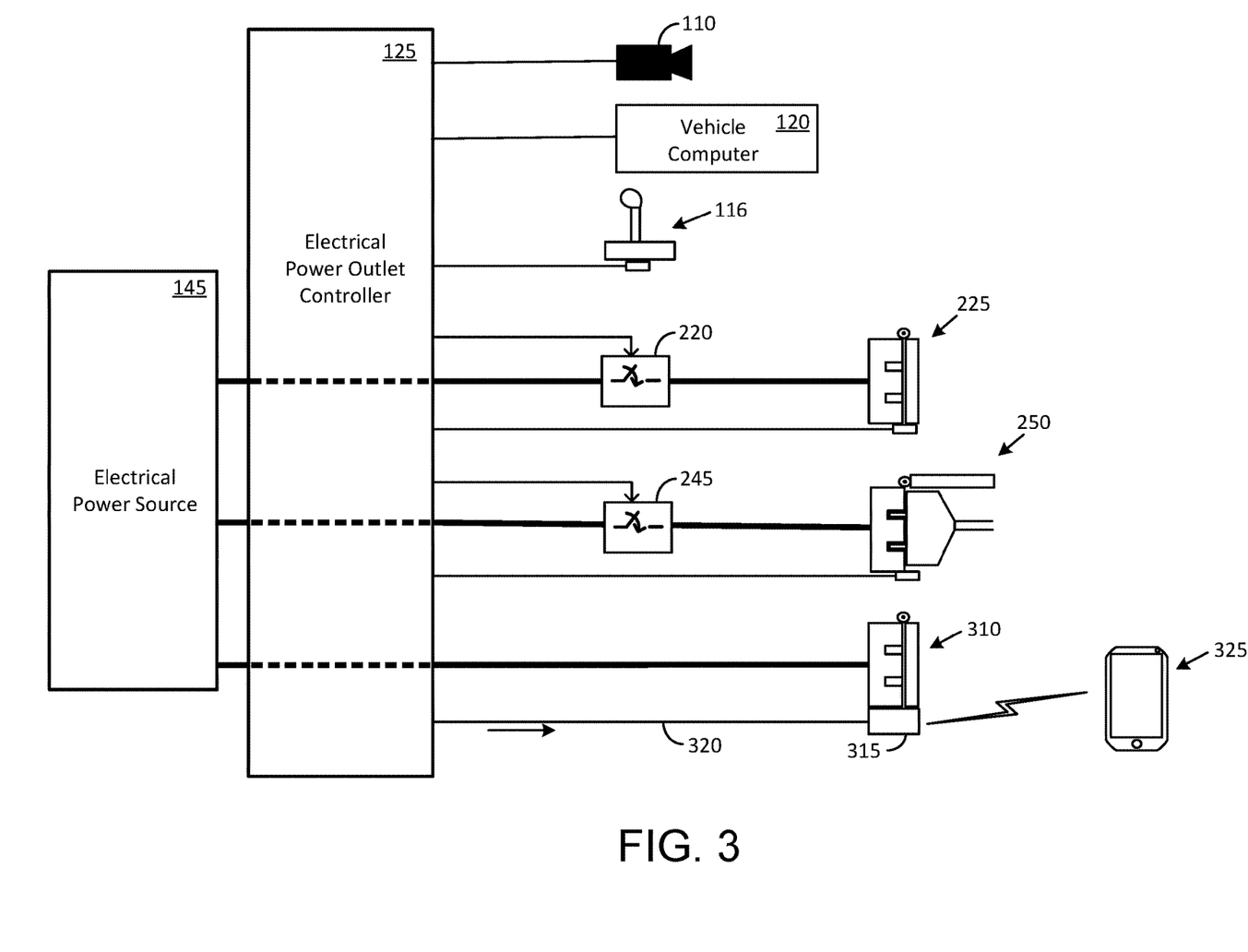
FIG. 3 illustrates another example configuration that may be associated with an electrical power outlet controller system in accordance with an embodiment of the disclosure.

FIG. 3 illustrates another example configuration that may be associated with the electrical power outlet controller system 125 in accordance with an embodiment of the disclosure. In this example configuration, the electrical power outlet controller system 125 is shown controlling power provided to three example electrical power outlets— an electrical power outlet 225, an electrical power outlet 250, and an electrical power outlet 310. Some aspects of the electrical power outlet 225 and the electrical power outlet 250 are described above. The electrical power outlet 310 may include a detector (not shown) such as the detector 228 described above, and can further include a communications interface 315.

The communications interface 315 is configured to provide communications between the electrical power outlet 310 and a wireless device 325 (such as, for example, the personal device 136 that is described above). Information can be exchanged between the communications interface 315 and the wireless device 325 by use of any of various communication media and communication formats such as, for example, Bluetooth®, cellular, WiFi, Zigbee®, or near-field-communications (NFC).

All or at least some of the information obtained by the communications interface 315 can be conveyed to the electrical power outlet controller system 125 via a link 320 that can be implemented by use of any of various wired and/or wireless media such as, for example, a coaxial cable, an optical fiber, and/or a WiFi link.

In an example scenario, the wireless device 325 may communicate with the electrical power outlet controller system 125 (via the communications interface 315) to negotiate use of the electrical power outlet 310 by a component such as, for example, the lawn mower 130 (shown in FIG. 1) and/or the portable refrigerator 150. The negotiations may involve, for example, assigning of an amount of power provided through the electrical power outlet 310, a fee for use of the electrical power outlet 310, charging times, charging procedures, charging guidance, and charging rules.

Figure 4:
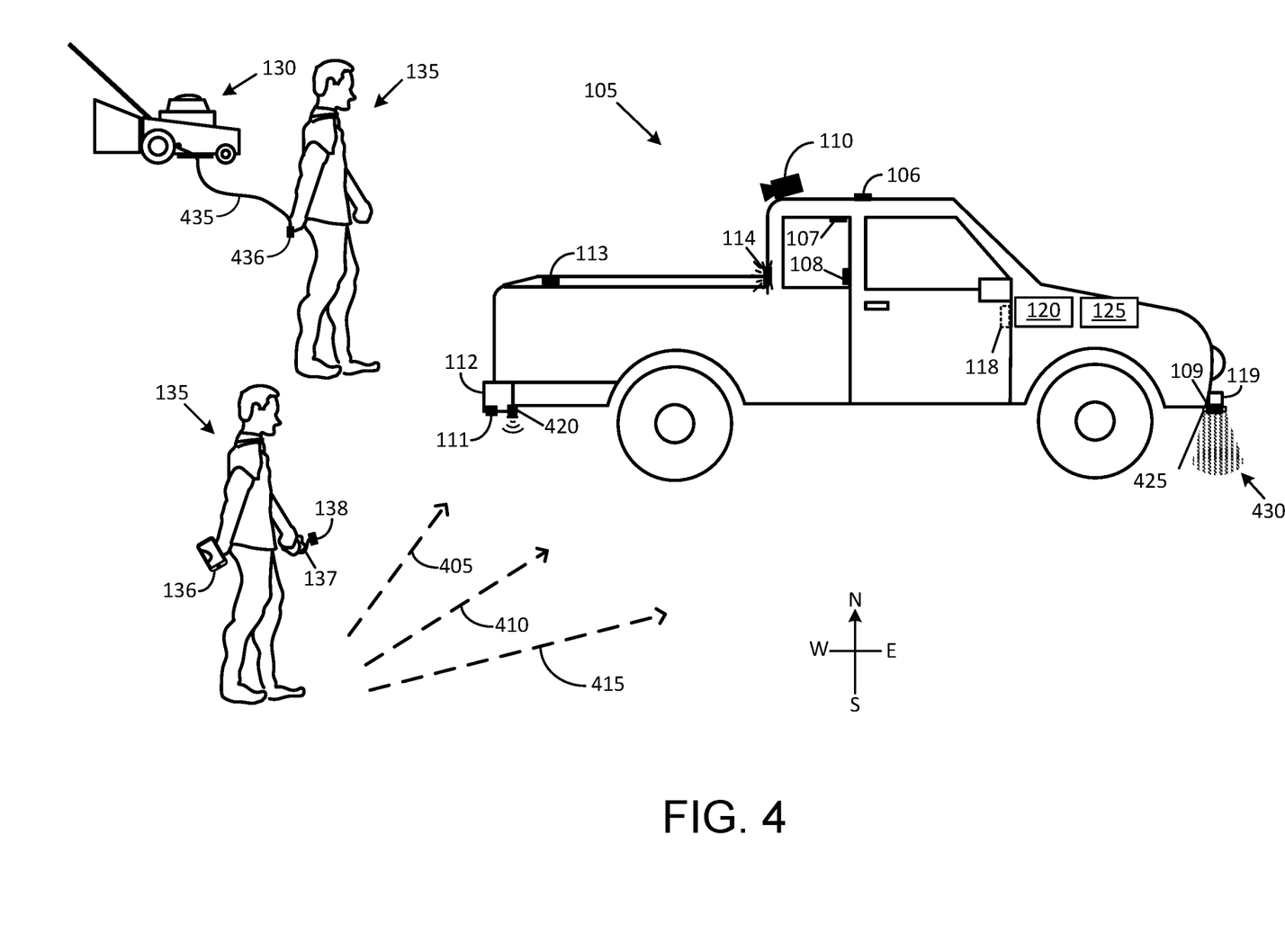
FIG. 4 illustrates some example scenarios that may be associated with an electrical power outlet controller system in accordance with an embodiment of the disclosure.

FIG. 4 illustrates some example scenarios that may be associated with the electrical power outlet controller system 125 in accordance with an embodiment of the disclosure. In a first example scenario, the individual 135 desires to replenish a battery charge of his/her personal device 136 and is seeking an electrical power outlet provided in the vehicle 105 for doing so. The vehicle 105 has multiple electrical power outlets some of which are described above in the form of examples. The individual 135 may, or may not, be aware of where each electrical power outlet is located in the vehicle 105, particularly, when the vehicle 105 is new or unfamiliar to the individual 135.

A first example path that the individual 135 may take for reaching an electrical power outlet provided in the cargo area of the vehicle 105 is to walk along a path 405 towards the rear portion of the vehicle 105 and search for an electrical power outlet located in the cargo area. However, the electrical power outlets provided in the cargo area may be configured to provide electrical power to certain types of objects that operate using 110V AC or 220V AC, such as, for example, hand tools, machinery, and power equipment.

In this example scenario, the individual 135 is carrying the personal device 136 and a charging cable 137. The charging cable 137 includes a connector 138, which can be, for example, a USB plug. The electrical power outlets provided in the rear portion of the vehicle 105 may be unsuitable for mating with the USB plug and for providing a suitable voltage to charge the battery of the personal device 136. In this situation, the electrical power outlet controller system 125 can provide assistance to the individual 135 in accordance with the disclosure to identify a suitable electrical power outlet located elsewhere on the vehicle 105.

A second example path that the individual 135 may take for reaching an electrical power outlet provided in the cargo area of the vehicle 105 is to walk along a path 410 towards a middle portion of the vehicle 105 and search for a power outlet located in the cargo area. The electrical power outlets provided in the middle portion of the vehicle 105 may also be configured to provide electrical power to certain types of objects that operate using 110V AC or 220V AC such as, for example, hand tools, machinery, and equipment. The electrical power outlets at this location may, or may not, include an electrical power outlet that is compatible with the connector 138 (a USB plug). If available, the electrical power outlet controller system 125 can provide assistance to the individual 135 in accordance with the disclosure to identify a location and an availability of an electrical power outlet in this portion of the vehicle 105.

A third example path that the individual 135 may take for reaching an electrical power outlet provided inside the cabin or outside in the vicinity of the cabin of the vehicle 105 is to walk along a path 415 towards a front portion of the vehicle 105. The electrical power outlets provided in the cabin of the vehicle 105 may be configured to provide connectivity to the connector 138 (a USB plug) of the charging cable 137 carried by the individual 135. In this case, the electrical power outlet controller system 125 can provide assistance to the individual 135 in accordance with the disclosure to determine the availability of a suitable electrical power outlet in the cabin or outside the cabin of the vehicle 105.

In another example scenario, the individual 135 desires to power up the lawn mower 130, and may walk towards the vehicle 105 carrying a power cord 435 that includes a connector 436 that is different than the connector 138. The connector 436 can be any of various types of connectors such as, for example, a two-prong plug, a three-prong plug, a 110V connector, or a 220V connector. Here again the individual 135 may or may not, be aware of where a suitable electrical power outlet is located in the vehicle 105 for insertion of the connector 436. The electrical power outlet controller system 125 can provide assistance to the individual 135 in accordance with the disclosure to determine the availability of a suitable electrical power outlet for this purpose.

The scenario where the individual 135 is shown walking towards the vehicle 105 while carrying the charging cable 137 will be used as an example for purposes of description below, but it must be understood that the description is equally relevant to other scenarios such as, for example, the scenario where the individual 135 is carrying the power cord 435.

The electrical power outlet controller system 125 can provide assistance to the individual 135 in various ways. In a first example method, the electrical power outlet controller system 125 detects the presence of the individual 135 by use of various sensors and detectors provided in the vehicle 105 such as, for example, an ultrasonic object detector (not shown) or the camera 110. In an example scenario, the electrical power outlet controller system 125 may detect the presence of the individual 135 based on evaluating an image captured by the camera 110.

Evaluation of the image can further provide various types of information about the individual 135 such as, for example, a location of the individual 135 with respect to the vehicle 105, a direction of movement of the individual 135 with respect to the vehicle 105, an intention of the individual 135, an identity of the individual 135, a communication device carried by the individual 135, and an authorization for use of an electrical power outlet of the vehicle 105 by the individual 135.

More particularly, the electrical power outlet controller system 125 may evaluate an image to identify whether the individual 135 is located inside a perimeter defined around the vehicle 105, whether the individual 135 is moving towards the vehicle 105 or away from the vehicle 105, and/or whether the individual 135 intends to access an electrical power outlet of the vehicle 105. In one case, the perimeter may be defined by a threshold distance from a chassis portion of the vehicle 105.

The intention of the individual 135 may be determined in various ways such as, for example, by detecting and identifying the personal device 136, the charging cable 137, and/or the connector 138 carried by the individual 135. Such objects may provide an indication that the individual 135 is seeking an electrical power outlet.

Furthermore, the processor 126 of the electrical power outlet controller system 125 may access a database that may be provided in the memory 127 of the electrical power outlet controller system 125 (and/or elsewhere in another device) to obtain information such as, for example, the identity of the individual 135 and an authorization status of the individual 135 for use of an electrical power outlet of the vehicle 105. The identity of the individual 135 may be determined based on techniques such as facial recognition and comparison to a photograph available in public records (a driver's license, for example). The authorization status may be determined based on access to a database.

After obtaining information associated with the individual 135, the electrical power outlet controller system 125 may obtain information about the connector 138 that is a part of the charging cable 137 carried by the individual 135. The information may be obtained based on evaluating the image provided by the camera 110 and/or based on information provided to the electrical power outlet controller system 125 by the individual 135 via the personal device 136.

The connector 138 in this example scenario is a USB connector. The electrical power outlet controller system 125 may then identify an electrical power outlet of the vehicle 105 that is compatible with the connector 138 (voltage, power handing capacity, availability, etc.). This operation may be carried out by accessing a database containing information about the location, physical characteristics, and electrical capabilities of various electrical power outlets provided in the vehicle 105. In an example implementation, the information may be provided in in the form of a graphical representation that can include a layout diagram of the vehicle 105 showing the various electrical power outlets, a description of a type of each electrical power outlet (two-prong, three-prong, USB, etc.), voltage (AC, DC, 110V, 12V, 220V, etc.), and accessibility (type of lid if present, open/closed status of lid, etc.).

In an example scenario, the electrical power outlet controller system 125 may identify the electrical power outlet 118 in the cabin of the vehicle 105 and the electrical power outlet 114 located on a body panel behind a cabin wall of the vehicle 105 as being compatible with the connector 138. In this case, the individual 135 is located outside the vehicle 105 and is closer to the electrical power outlet 114 than the electrical power outlet 118. Consequently, the electrical power outlet controller system 125 may provide to the individual 135, location information about the electrical power outlet 114 and guidance to move towards the electrical power outlet 114.

In another example scenario, where the individual 135 is approaching the vehicle 105 with the power cord 435 in hand, the electrical power outlet controller system 125 may provide location information and guidance to the individual 135 for moving towards the electrical power outlet 111 of the vehicle 105.

The guidance may be provided in various formats. Some example formats can include an audio signal, a visual indication, an audible instruction, a graphical indication, and a text message. In an example implementation, an audio signal may be provided by a beeper 420 that emits sound signals to guide the individual 135 towards the electrical power outlet 111. In one case, the beeper 420 may be configured to produce beeps of an increasing amplitude and/or an increased repetition rate, as the individual 135 approaches the electrical power outlet 111 (and vice-versa). The beeper 420 is located adjacent to the electrical power outlet 111 and the audio signal produced by the beeper 420 assists the individual 135 locate the electrical power outlet 111 (which may be hidden behind the rear bumper 112 of the vehicle 105).

In another example implementation, the electrical power outlet controller system 125 may provide a visual indication of the location of an electrical power outlet in any of various ways. Thus, for example, the electrical power outlet controller system 125 may configure a light source such as, for example, a light-emitting diode (LED) assembly located next to an electrical power outlet, or surrounding an electrical power outlet, to produce a flashing light signal. In one application, the flashing light signal may be produced by providing a pulsed current flow through an LED assembly. The color of light emitted by the LED assembly may be modified in some applications, such as, for example, from yellow to green for drawing attention to the electrical power outlet 114.

Another example of a visual indication may be provided in the form of an illumination of a ground surface below the vehicle 105. As shown, a light source 425 located around, or near, the electrical power outlet 109 may produce a beam of light 430 that illuminates the ground below the front bumper 119 and allows the individual 135 to locate the electrical power outlet 109. The electrical power outlet 109 may be hidden from view below or behind the front bumper 119.

In another example implementation, the electrical power outlet controller system 125 may provide audible instructions to guide the individual 135 towards an electrical power outlet in the vehicle 105. In one case, the audible instructions may be provided through a speaker system of the vehicle 105. In another case, the audible instructions may be provided by the electrical power outlet controller system 125 via the personal device 136 carried by the individual 135. The audible instructions in this case can be tailored by the electrical power outlet controller system 125 based on evaluating images provided by the camera 110. The tailored instructions may be used to rectify a movement path of the individual 135, for example, or to guide the individual 135 to an alternative electrical power outlet.

In another example implementation, the electrical power outlet controller system 125 may provide guidance to the individual 135 via the personal device 136 in the form of a graphical indication and/or a text message to guide the individual 135 towards an electrical power outlet in the vehicle 105. In one case, the graphical indication can include an iconic representation of the individual 135, a graphical representation of the vehicle 105, and/or an iconic/graphical representation of the electrical power outlet on the vehicle 105.

Figure 5:
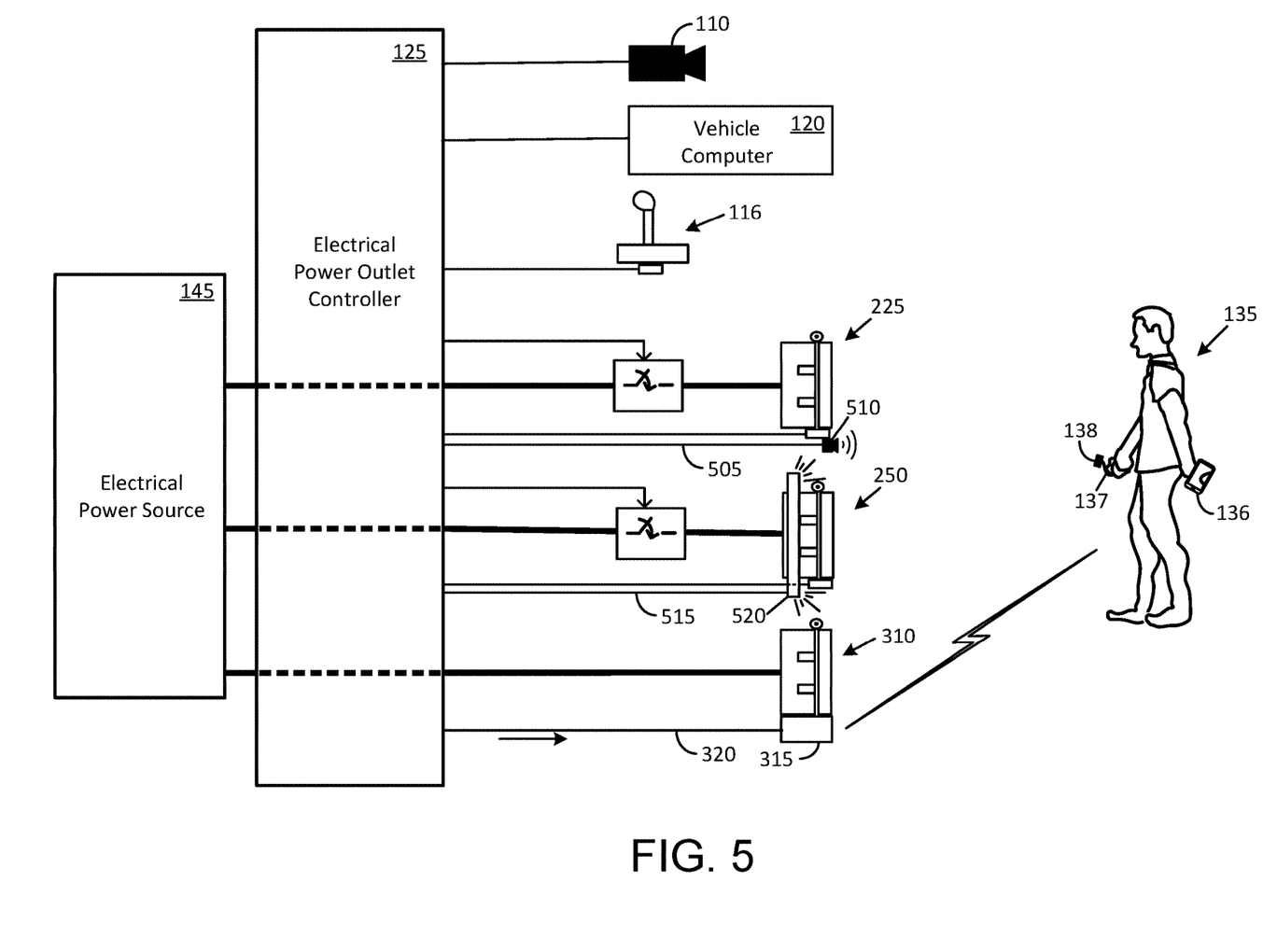
FIG. 5 illustrates another example configuration that may be associated with an electrical power outlet controller system in accordance with an embodiment of the disclosure.

FIG. 5 illustrates another example configuration that may be associated with the electrical power outlet controller system 125 in accordance with an embodiment of the disclosure. Some aspects pertaining to some of the components shown in FIG. 5 (camera 110, electrical power source 145, drive selector 116, electrical power outlet 225, etc.) have been described above with reference to FIG. 3.

The electrical power outlet controller system 125 may evaluate images provided by the camera 110 for various purposes. In an example case, the electrical power outlet controller system 125 may evaluate images to detect the individual 135 (who may be moving towards the vehicle) and/or to detect a child (not shown) who is in the vicinity of the vehicle 105. The electrical power outlet controller system 125 may also evaluate images to detect and identify objects carried by the individual 135 such as, for example, the personal device 136, the charging cable 137, and the connector 138.

The electrical power outlet controller system 125 may then execute various actions upon various electrical power outlets provided in the vehicle 105. For example, in one case, upon detecting a child 140 in the vicinity of the vehicle 105, the electrical power outlet controller system 125 may ensure that any electrical power outlet that is within reach of a child 140 is powered down and/or a lid of the electrical power outlet is placed in a closed position.

In another case, the electrical power outlet controller system 125 may identify a specific electrical power outlet that is compatible with the connector 138 and perform certain operations upon the electrical power outlet. Some example operations may include operating a switch for connecting power to the electrical power outlet, and opening a lid of the electrical power outlet.

In yet another case, the electrical power outlet controller system 125 may execute an identification procedure to identify the individual 135 and determine electrical power outlet usage parameters associated with the individual 135. The parameters can include, for example, a usage history, a usage fee, a billing rate, time periods for use, preferences for use of specific electrical power outlets (inside or outside the cabin, for example), and electrical power requirements (wattage, voltage, current draw etc.) for one or more devices associated with the individual 135.

Attention is now drawn to an audio transducer 510 that may be mounted adjacent to the electrical power outlet 225. The audio transducer 510 may be coupled to the electrical power outlet controller system 125 via a link 505 that can be a wired communications link and/or a wireless communication link configured to convey electrical signals for producing sound via the audio transducer 510. In an example implementation, the audio transducer 510 may be provided in the form of a beeper (such as the beeper 420 described above with reference to FIG. 4). The beeper can produce sound signals that may help guide the individual 135 to the electrical power outlet 225.

In another example implementation, the audio transducer 510 may be provided in the form of an audio transceiver that can include a speaker and a microphone. The audio transceiver may be located adjacent to the electrical power outlet 225 or may be located elsewhere upon the vehicle 105. The speaker can be configured to produce sound signals (beeps, for example) and/or vocalized messages (for example, "walk towards rear of vehicle," "outlet is located behind rear bumper of the vehicle," "Please describe the electrical cable and plug that you will be using," etc.). The microphone can be configured to capture spoken utterances of the individual 135 such as, for example, a response to a question issued through the speaker.

A second example component illustrated in FIG. 5 is a light source 520 that may be mounted adjacent to the electrical power outlet 250. The light source 520 may be coupled to the electrical power outlet controller system 125 via a link 515 that is configured to convey electrical signals for operating the light source 520. In an example implementation, the light source 520 is an LED arrangement having LED strips arranged to surround the electrical power outlet 225. The LED strips may produce a flashing light signal that draws the attention of the individual 135 and assists the individual 135 locate the electrical power outlet 250. The color of light emitted by the LEDs may be modified in some applications (for example, from yellow to green). In another example implementation, the light source 520 can be arranged to produce a beam of light that illuminates the ground below where the electrical power outlet 250 is located and allows the individual 135 to locate the electrical power outlet 250.

A third example component illustrated in FIG. 5 is the communications interface 315 that may be mounted adjacent to the electrical power outlet 310. Some aspects of the communication interface 315 have been provided above. In an example implementation, the electrical power outlet controller system 125 may provide guidance to the individual 135 (via the communications interface 315 and the personal device 136) in the form of a graphical indication and/or a text message to guide the individual 135 towards an electrical power outlet in the vehicle 105. In one case, the graphical indication can include an iconic representation of the individual 135, a graphical representation of the vehicle 105, and/or an iconic/graphical representation of the electrical power outlet on the vehicle 105.

Figure 6:
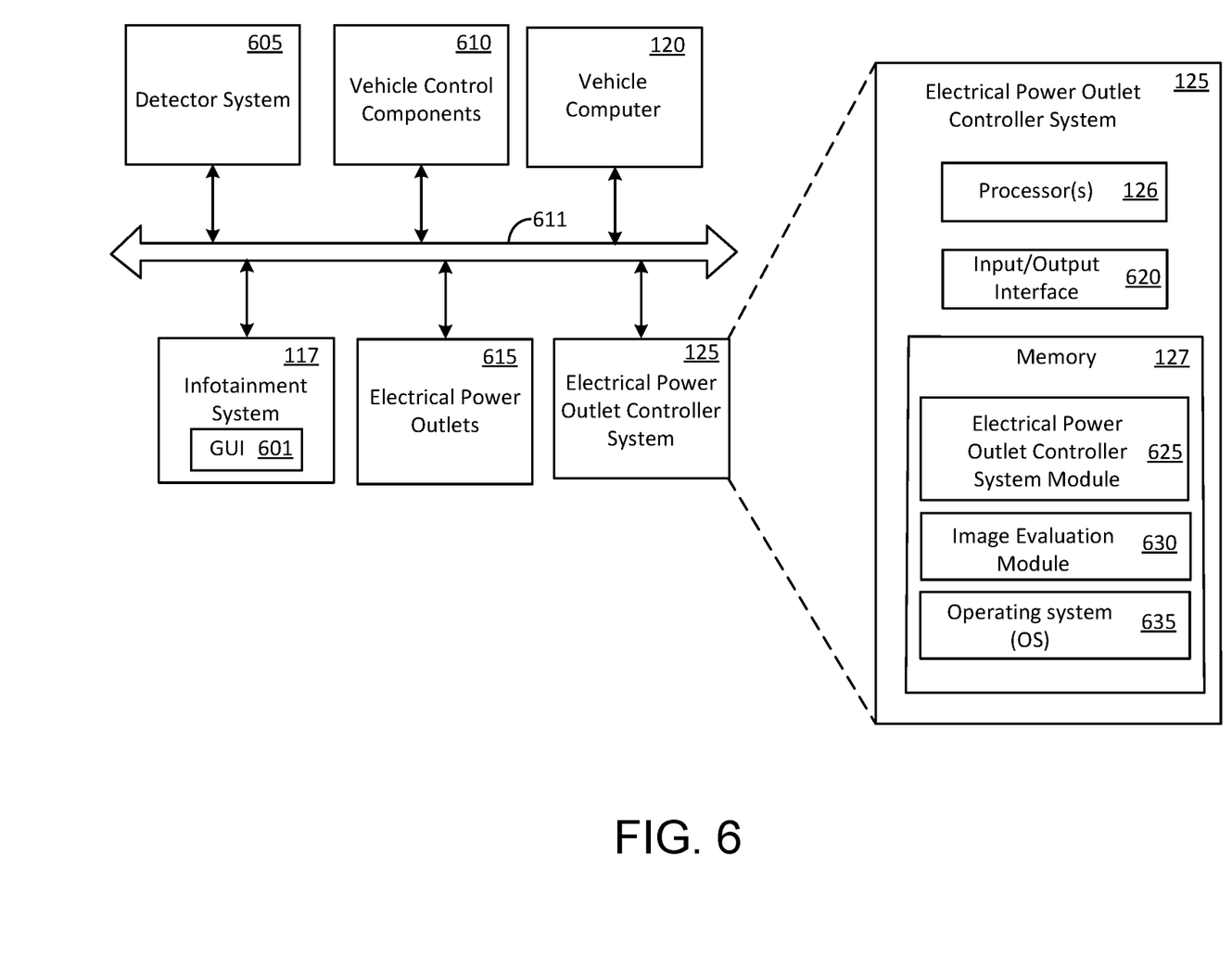
FIG. 6 shows some example components that can be included in a vehicle in accordance with an embodiment of the disclosure.

FIG. 6 shows some example components that can be included in the vehicle 105 in accordance with an embodiment of the disclosure. The example components can include a detector system 605, vehicle control components 610, the vehicle computer 120, the infotainment system 117, electrical power outlets 615, and the electrical power outlet controller system 125. The various components are communicatively coupled to each other via one or more buses such as an example bus 611. The bus 611 may be implemented using various wired and/or wireless technologies. For example, the bus 611 can be a vehicle bus that uses a controller area network (CAN) bus protocol, a Media Oriented Systems Transport (MOST) bus protocol, and/or a CAN flexible data (CAN-FD) bus protocol. Some or all portions of the bus 611 may also be implemented using wireless technologies such as Bluetooth®, Bluetooth®, Ultra-Wideband, Wi-Fi, Zigbee®, or near-field-communications (NFC).

The detector system 605 can include various types of detectors such as, for example, the camera 110 (shown in FIG. 1), the detector 228 (shown in FIG. 2), and the detector 253 (shown in FIG. 2). The signals conveyed by the various detectors of the detector system 605 to the electrical power outlet controller system 125 can vary in accordance with the type of detector. For example, the camera 110 can provide an image of the individual 135 (for example) in one of various formats (jpeg, mpeg, etc.), and the detector 228 can provide a digital signal indicating the cover of the electrical power outlet 225 in either a closed position or an open position.

The vehicle control components 610 can include various components and systems associated with driving-related functions of the vehicle 105 as well as with functions that are associated with the electrical power outlet controller system 125. Some example driving-related functions can include the operation of various vehicle components (engine, brakes, accelerator, fuel injection, etc.), and actions such as collision avoidance, automatic braking, and cruise control. The vehicle control components 610 may be controlled, activated, and/or operated by the vehicle computer 120. In some cases, some of the vehicle control components 610 may be controlled, activated, and/or operated by the electrical power outlet controller system 125. For example, the electrical power outlet controller system 125 may utilize some of the vehicle control components 610 to detect the individual 135 and control an operation of a lid of an electrical power outlet for use by the individual 135.

The infotainment system 117 can include a display system having a GUI 601 for carrying out various operations. The GUI may be used, for example, by the driver 115 of the vehicle 105 to interact with the electrical power outlet controller system 125, for obtaining information about various electrical power outlets in the vehicle 105, and/or for managing the operations of various electrical power outlets in the vehicle 105.

The electrical power outlets 615 can include the various example electrical power outlets described above.

The electrical power outlet controller system 125 can be implemented in various ways. In one example implementation, the electrical power outlet controller system 125 can be an independent device (enclosed in an enclosure, for example). In another example implementation, some or all components of the electrical power outlet controller system 125 can be housed, merged, or can share functionality, with the vehicle computer 120. For example, an integrated unit that combines the functionality of the electrical power outlet controller system 125 with that of the vehicle computer 120 can be operated by a single processor and a single memory device. In the illustrated example configuration, the electrical power outlet controller system 125 includes the processor 126, an input/output interface 620, and a memory 127.

The input/output interface 620 is configured to provide communications between the electrical power outlet controller system 125 and other components coupled to the bus 611, for example.

The memory 127, which is one example of a non-transitory computer-readable medium, may be used to store an operating system (OS) 635, an image evaluation module 630, and various code modules such as, for example, an electrical power outlet controller module 625. The code modules are provided in the form of computer-executable instructions that can be executed by the processor 126 for performing various operations in accordance with the disclosure.

The electrical power outlet controller module 625 may be executed by the processor 126 for performing various operations in accordance with the disclosure. Some example operations are described above. Execution of some of these operations can involve the electrical power outlet controller module 625 utilizing the image evaluation module 630 for evaluating images captured by the camera 110.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 127, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   determining, by a processor, that an individual is seeking an electrical power outlet provided on a vehicle;
   selecting, by the processor, a first electrical power outlet from a plurality of electrical power outlets provided on the vehicle; and
   providing, by the processor, location information of the first electrical power outlet,
   wherein providing location information of the first electrical power outlet comprises providing, by the processor, at least one of an audio signal, a visual indication, an audible instruction, a graphical indication, and a text message, and
   wherein the individual is located within a threshold distance outside the vehicle, wherein the audio signal comprises a beeping sound, wherein the visual indication comprises illumination of the electrical power outlet, wherein the audible instruction provides navigation assistance to reach the electrical power outlet, wherein the graphical indication includes location information of the electrical power outlet on the vehicle, and wherein the text message provides navigation assistance to reach the electrical power outlet.

2. The method of claim 1, wherein determining that the individual is seeking the first electrical power outlet comprises:
   receiving, by the processor, an image of the individual proximate the vehicle; and
   selecting, by the processor, the first electrical power outlet based on identifying in the image, at least one of an electrical cord or an electrically-powered device.

3. The method of claim 2, wherein the individual is one of located inside the vehicle or located within a threshold distance outside the vehicle.

4. The method of claim 2, further comprising:
   identifying, by the processor, a type of connector that is a part of the electrical cord; and
   determining, by the processor, the type of connector is compatible with the first electrical power outlet.

5. The method of claim 2, further comprising:
   identifying, by the processor, a type of connector that is a part of the electrical cord;
   determining, by the processor, that the type of connector is incompatible with a second electrical power outlet provided on the vehicle; and
   identifying, by the processor, the first electrical power outlet having a configuration that is compatible to the type of connector.

6. A method comprising:
   detecting, by a processor, an individual located outside a vehicle;
   determining, by the processor, that the individual is seeking an electrical power outlet provided in the vehicle;
   identifying, by the processor, a first electrical power outlet on the vehicle that is accessible from outside the vehicle;
   providing, by the processor, to the individual, assistance to move towards the first electrical power outlet;
   evaluating, by the processor, an image of the individual; and
   detecting, by the processor, based on evaluating the image, that the individual is carrying at least one of an electrical cord or an electrically-powered device.

7. The method of claim 6, wherein identifying the first electrical power outlet comprises:
   obtaining, by the processor, information associated with a set of electrical power outlets provided on the vehicle and accessible from outside the vehicle; and
   determining, by the processor, that the first electrical power outlet among the set of electrical power outlets is located closest to the individual.

8. The method of claim 6, wherein identifying the first electrical power outlet comprises:
   detecting, by the processor, a type of connector that is a part of the electrical cord;
   comparing, by the processor, the type of connector to a configuration of the first electrical power outlet; and
   providing, by the processor, to the individual, assistance to move towards the first electrical power outlet, subject to the configuration of the first electrical power outlet being compatible with the type of connector.

9. The method of claim 8, further comprising:
detecting, by the processor, an incompatibility between the configuration of the first electrical power outlet and the type of connector;
identifying, by the processor, a second electrical power outlet that is compatible to the type of connector; and
providing, by the processor, to the individual, assistance in locating the second electrical power outlet in the vehicle.

10. The method of claim 6, further comprising:
determining, by the processor, an identity of the individual seeking the electrical power outlet provided in the vehicle; and
providing, by the processor, to the individual, access to the first electrical power outlet based on authenticating the individual.

11. The method of claim 10, wherein determining the identity of the individual comprises evaluating an image of the individual, and wherein authenticating the individual comprises:
verifying, by the processor, an authorization status of the individual; and
authenticating, by the processor, the individual, based on the authorization status of the individual.

12. A vehicle comprising:
an imaging device;
an electrical power outlet controller comprising:
a memory that stores computer-executable instructions; and
a processor configured to access the memory and execute the computer-executable instructions to perform operations comprising:
evaluating an image provided by the imaging device;
determining, based on evaluating the image, that an individual is seeking an electrical power outlet provided in the vehicle;
selecting a first electrical power outlet from a plurality of electrical power outlets provided on the vehicle;
providing location information of the first electrical power outlet;
detecting that a cover of the first electrical power outlet is in a closed position;
placing the cover of the first electrical power outlet in an open position; and
connecting electrical power to the first electrical power outlet.

13. The vehicle of claim 12, wherein the processor is further configured to access the memory and execute the computer-executable instructions to perform operations comprising:
determining, based on evaluating the image, an intended use of the first electrical power outlet;
determining a power handling capacity of the first electrical power outlet;
determining that the power handling capacity of the first electrical power outlet supports the intended use of the first electrical power outlet; and
providing, to the individual, a communication comprising the location information of the first electrical power outlet.

14. The vehicle of claim 13, wherein determining the intended use of the first electrical power outlet is based on evaluating, in the image, a personal device or an electrically-powered device carried by the individual.

15. The vehicle of claim 14, wherein the intended use is one of charging a battery of the personal device or operating the electrically-powered device.

16. The vehicle of claim 13, wherein providing the location information comprises conveying a text message and/or a graphic to a personal device of the individual.

17. A method comprising:
determining, by a processor, that an individual is seeking an electrical power outlet provided on a vehicle;
selecting, by the processor, a first electrical power outlet from a plurality of electrical power outlets provided on the vehicle; and
providing, by the processor, location information of the first electrical power outlet,
wherein determining that the individual is seeking the first electrical power outlet comprises:
receiving, by the processor, an image of the individual proximate the vehicle; and
selecting, by the processor, the first electrical power outlet based on identifying in the image, at least one of an electrical cord or an electrically-powered device.

18. A method comprising:
detecting, by a processor, an individual located outside a vehicle;
determining, by the processor, that the individual is seeking an electrical power outlet provided in the vehicle;
identifying, by the processor, a first electrical power outlet on the vehicle that is accessible from outside the vehicle;
providing, by the processor, to the individual, assistance to move towards the first electrical power outlet;
determining, by the processor, an identity of the individual seeking the electrical power outlet provided in the vehicle; and
providing, by the processor, to the individual, access to the first electrical power outlet based on authenticating the individual, wherein determining the identity of the individual comprises evaluating an image of the individual, and wherein authenticating the individual comprises:
verifying, by the processor, an authorization status of the individual; and
authenticating, by the processor, the individual, based on the authorization status of the individual.

* * * * *